(12) United States Patent
Jeon

(10) Patent No.: US 9,975,486 B2
(45) Date of Patent: May 22, 2018

(54) VEHICLE ASSISTANCE APPARATUS AND OPERATING METHOD THEREOF

(71) Applicant: HYUNDAI MOBIS Co., Ltd., Yongin-si, Gyeonggi-do (KR)

(72) Inventor: Mi Jin Jeon, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 466 days.

(21) Appl. No.: 14/663,527

(22) Filed: Mar. 20, 2015

(65) Prior Publication Data

US 2016/0121793 A1    May 5, 2016

(30) Foreign Application Priority Data

Oct. 31, 2014  (KR) ........................ 10-2014-0150583

(51) Int. Cl.
| | | |
|---|---|---|
| H04N 7/18 | (2006.01) | |
| B60R 1/00 | (2006.01) | |
| B60Q 1/22 | (2006.01) | |
| B60Q 1/26 | (2006.01) | |

(52) U.S. Cl.
CPC ............ *B60R 1/00* (2013.01); *B60Q 1/22* (2013.01); *B60Q 1/2607* (2013.01); *B60R 2300/70* (2013.01)

(58) Field of Classification Search
None
See application file for complete search history.

(56) References Cited

U.S. PATENT DOCUMENTS

| | | | |
|---|---|---|---|
| 2011/0193960 A1 | 8/2011 | Endo et al. | |
| 2012/0154591 A1* | 6/2012 | Baur | B60R 1/00 348/148 |
| 2012/0224059 A1 | 9/2012 | Takamatsu | |
| 2015/0070486 A1 | 3/2015 | Nakata et al. | |
| 2015/0109499 A1 | 4/2015 | Endo et al. | |

FOREIGN PATENT DOCUMENTS

| | | | |
|---|---|---|---|
| CN | 201533370 U | 7/2010 | |
| JP | 2011-162080 A | 8/2011 | |
| JP | 2012-186582 A | 9/2012 | |
| JP | 2013-224081 A | 10/2013 | |
| JP | 2014-146954 A | 8/2014 | |
| JP | 2014146954 A * | 8/2014 | ............... G08G 1/16 |
| KR | 10-2003-0057514 A | 7/2003 | |

OTHER PUBLICATIONS

May 24, 2016, Korean Notice of Allowance for related KR application No. 10-2014-0150583.
Chinese Office Action for related CN Application No. 201510154930.7 dated Nov. 16, 2017 from Chinese Patent Office.

* cited by examiner

*Primary Examiner* — Heather Jones
(74) *Attorney, Agent, or Firm* — Paratus Law Group, PLLC

(57) ABSTRACT

Disclosed is an apparatus for assisting a vehicle, including: a gear mounted in a vehicle and configured to switch an operation mode into any one of a travelling mode, a parking mode, a neutral mode, and a reverse mode of the vehicle; one or more lighting devices provided in the vehicle; a camera mounted in the vehicle, and configured to obtain an image around the vehicle; a processor configured to decrease a gain of a first color in an RGB image, which is received from the camera and includes light emitted from the taillight when the operation mode is switched into the reverse mode; and an output unit configured to output the image processed by the processor.

18 Claims, 4 Drawing Sheets

(A) (B)

VEHICLE ASSISTANCE APPARATUS AND OPERATING METHOD THEREOF

CROSS-REFERENCE TO RELATED APPLICATIONS

The present application claims priority to Korean Patent Application Number 10-2014-0150583 filed Oct. 31, 2014, the entire contents of which the application is incorporated herein for all purposes by this reference.

TECHNICAL FIELD

The present invention relates to a vehicle assistance apparatus and an operating method thereof.

BACKGROUND

In general, a vehicle is provided with a rearview mirror and left/right mirrors, and a driver recognizes a state of a rear side using the rearview mirror when reversing or parking the vehicle. However, when a driver recognizes a situation of a rear side of the vehicle through the rearview mirror, there is a blind area, so that there is a collision risk during parking or reversing.

That is, there frequently occurs a case where a driver reverses the vehicle while travelling, and in this case, the driver cannot see an object located in a blind area at a rear side of the vehicle, such that the driver needs to get out of the vehicle to directly check for the object at the rear side while reversing the vehicle, or another person, other than the driver, has to stand at the rear side of the vehicle and assist the driver by looking for the object, consequently, there is a problem in that it is considerably inconvenient to reverse the vehicle and a minor collision or safety accident is incurred.

Accordingly, a rear monitoring apparatus for enabling a driver to easily check for an object located in a blind area at a rear side while a vehicle is reversed to prevent a safety accident, such as a minor collision, is demanded.

The rear monitoring apparatus includes a rear sensor and a rear monitoring camera. The rear monitoring camera obtains an image around a rear side, and light emitted from a tail light is reflected from the ground surface or a wall surface while a vehicle is reversed and enters the camera in the state where one or more vehicle lighting apparatuses are turned on, so that there is a problem in that the light emitted from the lighting apparatus is shown on an image.

A rear monitoring camera for a vehicle assistance apparatus and a control method thereof are disclosed under Korean Patent Application Laid-Open No. 2003-0057514.

SUMMARY

The present invention has been made in an effort to provide a vehicle assistance apparatus for providing an image which does not include light emitted from a lighting apparatus even when a vehicle is reversed in a state where one or more lighting apparatuses are turned on, and an operating method thereof.

Objects of the present invention are not limited to the objects described above, and other objects that are not described will be clearly understood by a person skilled in the art from the description below.

An exemplary embodiment of the present invention provides an apparatus for assisting a vehicle, including: a gear mounted in a vehicle and configured to switch an operation mode into any one of a travelling mode, a parking mode, a neutral mode, and a reverse mode of the vehicle; one or more lighting devices provided in the vehicle; a camera mounted in the vehicle, and configured to obtain an image around the vehicle; a processor configured to process a first color to be decreased in an RGB image, which is received from the camera and includes light emitted from the taillight when the operation mode is switched into the reverse mode; and an output unit configured to output the image processed by the processor.

Another exemplary embodiment of the present invention provides an operating method of an apparatus for assisting a vehicle, including: receiving gear information; turning on one or more lighting device provided in a vehicle; obtaining an image around the vehicle from a camera attached to the vehicle; processing a first color to be decreased in an RGB image, which is received from the camera and includes light emitted from the lighting device when the received gear information indicates a reverse mode; and outputting, by the processor, the processed image through an output unit.

Other detailed matters of the exemplary embodiments are included in the detailed description and the drawings.

According to the exemplary embodiments of the present invention, there are one or more effects as follows.

First, light emitted from a lighting device provided in a vehicle is reflected and enters a camera, so that it is possible to solve a phenomenon in which a color of an image is shown with a first color.

Second, it is possible to provide a user with a more actual rear environment image.

The effects of the present invention are not limited to the aforementioned effects, and other effects, which are not mentioned above, will be clearly understood by those skilled in the art from the claims.

DETAILED DESCRIPTION

Figure 1:
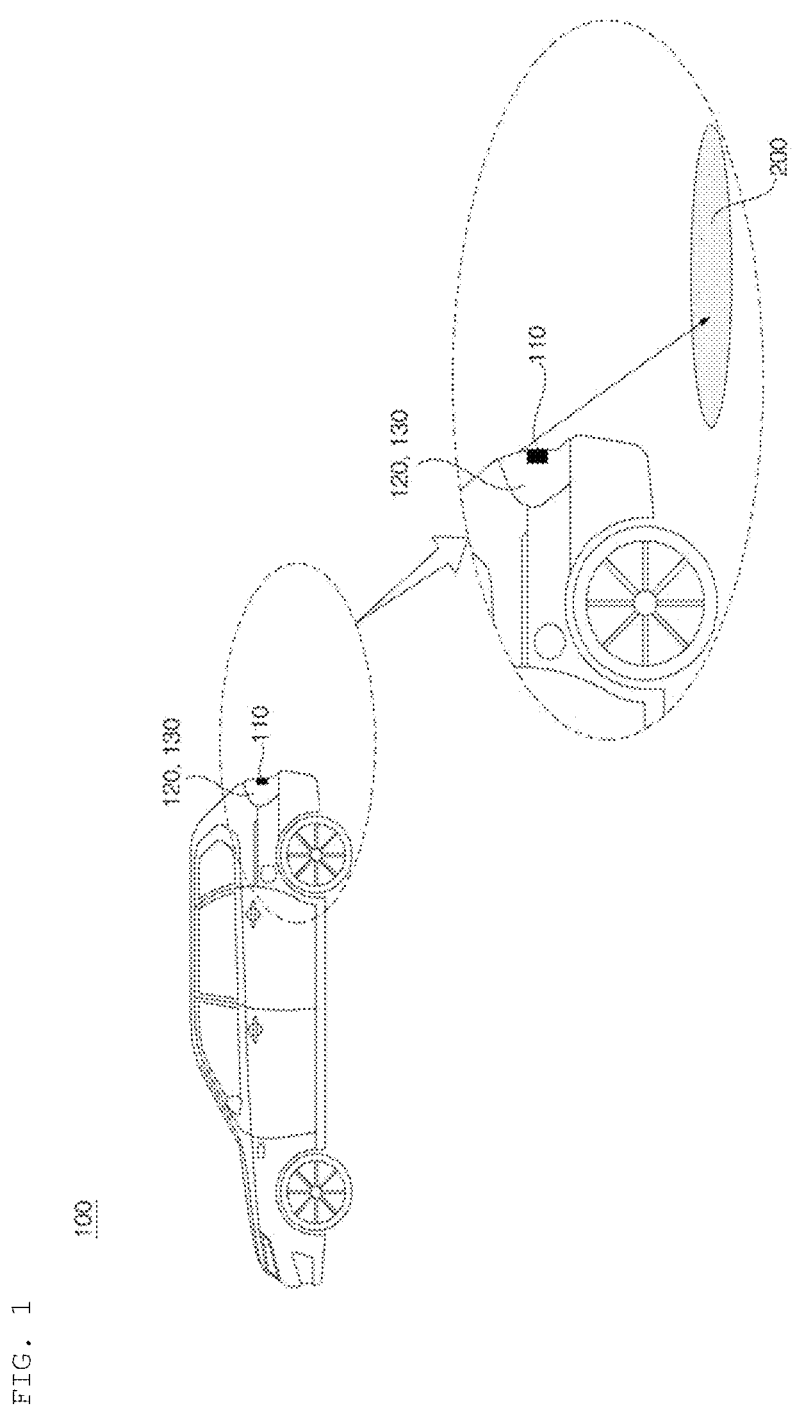
FIG. 1 is a diagram schematically illustrating a vehicle including a vehicle assistance apparatus according to an exemplary embodiment of the present invention.

Various advantages and features of the present invention and methods accomplishing thereof will become apparent from the following detailed description of exemplary embodiments with reference to the accompanying drawings. However, the present invention is not limited to the exemplary embodiments set forth below, and may be embodied in various other forms. The exemplary embodiments introduced herein are provided to make disclosed contents thorough and complete and sufficiently transfer the spirit of the present invention to those skilled in the art, and the present invention will only be defined by the scope of the claims. Like reference numerals indicate like elements throughout the specification.

In the present specification, names of constituent elements are classified as a first . . . , a second . . . , and the like so as to discriminate the constituent elements having the same name, and the names are not essentially limited to the order in the description below.

FIG. 1 is a diagram schematically illustrating a vehicle including a vehicle assistance apparatus according to an exemplary embodiment of the present invention.

Referring to FIG. 1, a vehicle is a means of transportation, which generates power by an autonomous engine, transmits the generated power to wheels, and transports a passenger or cargo on a road. The vehicle may be generally divided into a body forming an external appearance and a chassis in which various devices are organically connected. The chassis includes main devices, such as a vehicle engine that is a driving force to move the vehicle, a power transmission device, a steering device, a suspension device, and a braking device.

In general, various lighting devices are mounted at a front part and a rear part of the vehicle to provide vehicle safety and driving convenience, and the lighting devices include a headlight, a taillight, a stop lamp, a turn signal lamp 132, a sidelight 131, and the like.

The headlight is a lighting device, which is attached to the front part of the vehicle and illuminates a front side while travelling at night to secure a driver's view. The headlight may be generally divided into a unit driven headlight and a reflector driven headlight. The unit driven headlight includes an assembly-type headlight, a semisealed beam headlight, a metal back sealed beam head lamp, and a projector-type headlight. In the past, most of the headlights were the assembly-type headlight, in which a lens bulb reflector is assembled, but lighting efficiency of the assembly-type headlight became degraded by moisture or dust, so that currently the sealed beam headlight having an integral structure has been widely used.

The headlight generally requires brightness at which it is possible to confirm an object located at 100 m in front in the dark. The headlight may have a low beam function of emitting light toward a downward side and a high beam function of emitting light toward an upward side. The kind of light sources used in the headlight includes a halogen lamp, a high intensity discharge (HID) lamp, a light emitting diode (LED) and the like.

The taillight 120 is a lighting device attached to a rear part of the vehicle, and is automatically turned on when the headlight is turned on. The stop lamp 130 is a lighting device automatically turned on for providing an alarm to a rear traveling vehicle when a driver steps on a brake pedal. The taillight 120 and the stop lamp 130 generally have red.

The turn signal lamp 132 is a lighting device attached to the front part, the rear part or the side mirror of the vehicle to intermittently emit light when the vehicle changes a direction or in order to notify another vehicle that the vehicle is in a temporal dangerous state. In the meantime, the turn signal lamp 132 may also be used as an emergency lamp by flickering a plurality of lights included in the turn signal lamp 132.

The sidelight 131 is positioned at the front part or the rear part of the vehicle so that another vehicle may recognize existence of the vehicle or a vehicle width.

In the meantime, the vehicle may include one or more cameras. For example, the vehicle may include a plurality of cameras for an around view monitoring (AVM) system. Further, the vehicle may include a rear camera for assisting a driver to secure a view while being reversed. The camera mounted in the vehicle serves to promote convenience of a driver by obtaining an image around the vehicle.

In the meantime, when the taillight 120 or the stop lamp 130 is turned on, light 200 emitted from the taillight 120 or the stop lamp 130 may be reflected from the ground or a wall surface. In this case, light may be red. When the taillight 120 or the stop lamp 130 is turned on, light emitted from the lamp may be reflected from the ground or a wall surface to enter the camera installed at a the rear part of the vehicle. In this case, an image received from a camera 110 includes a plurality of red colors, so that a driver may sense a difference.

Figure 2:
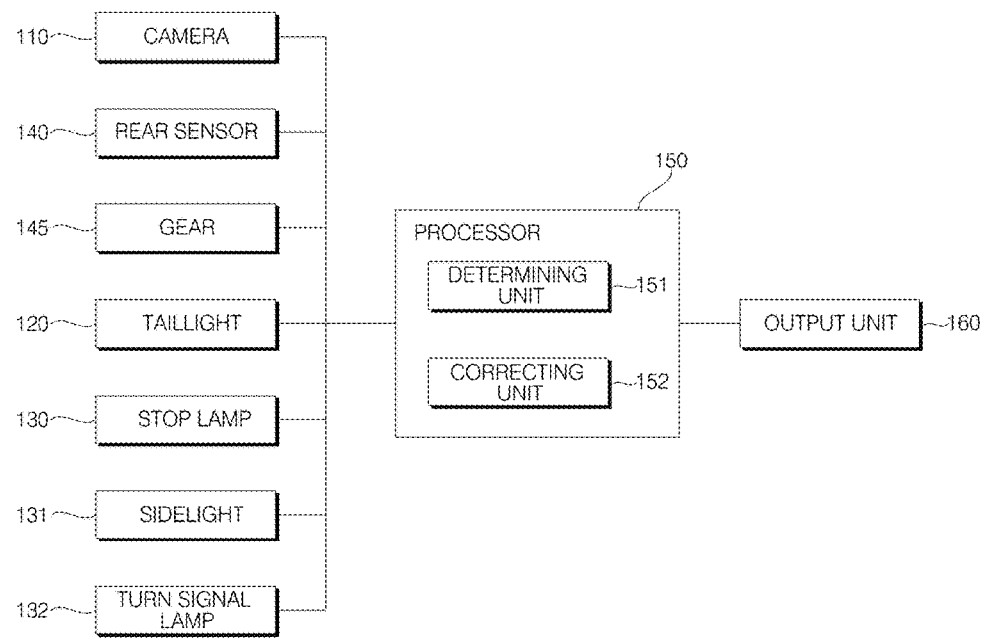
FIG. 2 is a block diagram of the vehicle assistance apparatus according to the exemplary embodiment of the present invention.

In the meantime, when the sidelight 131 and the turn signal lamp 132 are turned on, light emitted from the sidelight 131 or the turn signal lamp 132 may be reflected from the ground or a wall surface. In this case, light may be yellow. When the sidelight 131 or the turn signal lamp 132 is turned on, light emitted from the lamp may be reflected from the ground or a wall surface to enter the camera installed at a the rear part of the vehicle. In this case, an image received from the camera 110 includes a plurality of yellow colors, so that a driver may sense a difference. FIG. 2 is a block diagram of the vehicle assistance apparatus according to the exemplary embodiment of the present invention.

Referring to FIG. 2, the vehicle assistance apparatus according to the exemplary embodiment of the present invention includes the camera 110, the taillight 120, the stop lamp 130, the sidelight 131, the turn signal lamp 133, a rear sensor 140, a gear 145, a processor 150, and an output unit 160.

The camera 110 obtains an image around the vehicle. One or more cameras 110 may be mounted in the vehicle. As described above, the camera 110 outputs an image of the AVM system, or a lateral side or a rear side of the vehicle, thereby assisting a driver to secure a view.

In the present specification, the camera 110 is described based on the rear camera mounted at the rear part of the vehicle to obtain a rear image of the vehicle. However, the camera is not limited thereto, and it is stated that the present invention is applicable to the camera mounted at a front part, a left part, or a right part of the vehicle.

The camera 110 includes an image sensor, such as a charge coupled device (CCD) or a complementary metal oxide semiconductor (CMOS).

The taillight 120 is mounted at the rear part of the vehicle. The taillight 120 may be turned on when the headlight of the vehicle is turned on, but is not limited thereto. When the taillight 120 is turned on or off, each signal is transmitted to the processor 150 by a predetermined communication method (for example, CAN communication).

The stop lamp 130 is a lamp which is turned on when a driver steps on a brake pedal of the vehicle. When the stop lamp 130 is turned on or off, each signal is transmitted to the processor 150 by a predetermined communication method (for example, CAN communication).

The sidelight 131 is a lamp turned on when the vehicle travels at night time so that another vehicle may recognize the existence and a vehicle width of the vehicle. When the sidelight 131 is turned on or off, each signal is transmitted to the processor 150 by a predetermined communication method (for example, CAN communication).

The turn signal lamp 132 is a lighting device attached to the front part, the rear part or the side mirror of the vehicle to intermittently emit light when the vehicle changes a direction or in order to notify another vehicle that the vehicle is in a temporal dangerous state. When the turn signal lamp 132 is turned on or off, each signal is transmitted to the processor 150 by a predetermined communication method (for example, CAN communication).

The rear sensor 140 is attached to the rear part of the vehicle and detects an obstacle located at a rear side of the vehicle. The rear sensor 140 may be an ultrasonic sensor. The ultrasonic sensor is a sensor for transmitting ultrasonic waves to a target, receiving the reflected ultrasonic waves, and detecting a distance to the target and a direction of the target.

When the obstacle is detected at the rear side, the rear sensor 140 outputs an alarm sound. In this case, the rear sensor 140 may output a detection signal divided into a plurality of levels according to a distance to the obstacle, and output an audible alarm sound according to the detection signal. For example, when a distance to the obstacle detected by the rear sensor 140 is 1 m, the rear sensor 140 may output a first signal, when a distance to the obstacle detected by the rear sensor 140 is 50 cm, the rear sensor 140 may output a second signal, and when a distance to the obstacle detected by the rear sensor 140 is 30 cm, the rear sensor 140 may output a third signal. In this case, a voice output unit (not illustrated) may alarm the driver by outputting different voices corresponding to the first signal, the second signal, and the third signal, respectively.

The gear 145 switches a driving mode of the vehicle. That is, the gear 145 may switch the driving mode to any one of a travelling mode, a parking mode, a neutral mode, a reverse mode of the vehicle according to a user's input.

In the present specification, it is described that the gear 145 is an automatic transmission, but those skilled in the art will clearly appreciate that a manual transmission may also be included in the scope of the present invention.

The processor 150 receives an image from the camera 110. The image may be an RGB image. That is, the image may be an image of an RGB color space.

When the processor 150 receives an image in the state where the taillight 120 is turned on, the RGB image includes light emitted from the taillight 120, so that a ratio of red may be high.

When the processor 150 receives an image in the state where the stop lamp 130 is turned on, the RGB image includes light emitted from the taillight 130, so that a ratio of red may be high.

Otherwise, when the processor 150 receives an image in the state where the sidelight 131 or the turn signal lamp 132 is turned on, the RGB image includes light emitted from the sidelight 131 or the turn signal lamp 132, so that a ratio of yellow color may be high.

In the meantime, light emitted from the taillight 120, the stop lamp 130, the sidelight 131, or the turn signal lamp 132 may be reflected by a ground or a wall surface and enter the camera 110.

The processor 150 decreases a gain of a first color in the RGB image. Here, the first color may be red. For example, the processor 150 may decrease a gain of red by decreasing a gain value of red R among the gain values of red R, green G, and blue B. For example, the processor 150 may decrease a gain of the yellow color by decreasing a gain value of red R and a gain value of green G among the gain values of red R, green G, and blue B.

In the meantime, the processor 150 may decrease the gain of the red color based on the detection signal received by the rear sensor 140. The rear sensor 140 may output the signal by dividing the signal into a plurality of levels according to a distance to the obstacle as described above. In this case, the processor 150 may vary a degree of gain of the first color in accordance with each of the plurality of levels and decrease the gain of the first color. Here, the first color may be red. For example, when a first signal is input from the rear sensor 140, the processor 150 may set a gain value of red R as G1. When a second signal is input from the rear sensor 140, the processor 150 may set a gain value of red R as G2. When a third signal is input from the rear sensor 140, the processor 150 may set a gain value of red R as G3. As described above, a red component is varied in an image displayed on the output unit 160 by varying a weighed value of red according to the distance to the obstacle detected by the rear sensor.

The processor 150 includes a determining unit 151 and a correcting unit 152.

The determining unit 151 determines whether the first color has a reference value or larger in the RGB image. Here, the first color may be red. The reference value may be a value predetermined by an experiment. For example, the determining unit 151 may determine whether red has the reference value or larger based on whether a red component in a region equal to or larger than a reference region in the entire RGB image has the reference value or larger. For example, the determining unit 151 may determine whether a red component in a region of 70% or more of the entire RGB image has the reference value or larger, and determine whether to decrease a gain of the red color.

The correcting unit 152 receives a result of the determination by the determining unit 151 and decreases the gain of the first color in the RGB image. Here, the first color may be red. In the meantime, as described above, when the signal is divided in to the plurality of levels according to the distance to the obstacle and output from the rear sensor 140, the correcting unit 152 may vary a degree of the gain of the first color in accordance with each of the plurality of levels and apply the varied gains to the RGB images. A method of decreasing the gain of the first color may adopt an image processing method published in the related art.

The output unit 160 outputs the image processed by the processor 150. The output unit 160 includes one or more displays. The output unit 160 may be an audio video navigation (AVN) device mounted inside the vehicle to support audio, video, and navigation functions. The output unit 160 may be mounted in a center fascia or a cluster.

Figure 3:
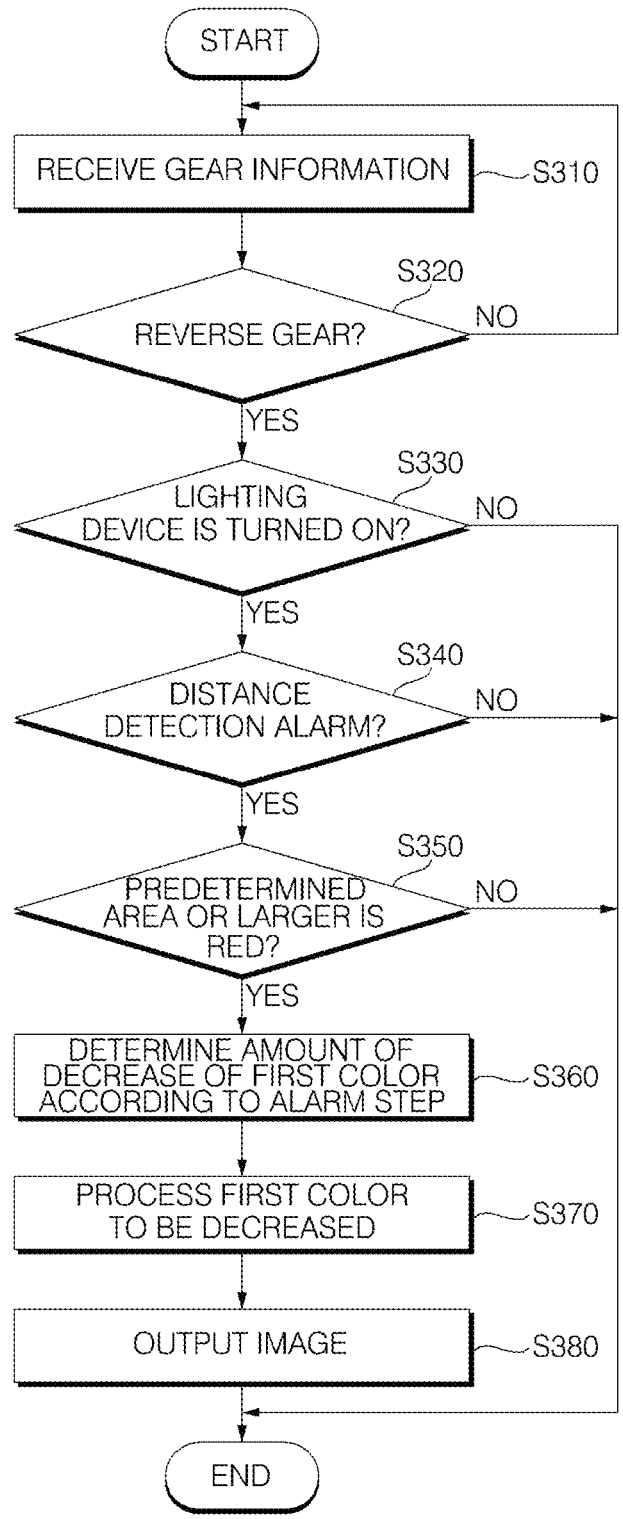
FIG. 3 is a flowchart of an operation of the vehicle assistance apparatus according to the exemplary embodiment of the present invention.

FIG. 3 is a flowchart of an operation of the vehicle assistance apparatus according to the exemplary embodiment of the present invention.

Referring to FIG. 3, the processor 150 receives information about the gear 145 (S310). An operation mode may be switched to a rear mode according to a manipulation of the gear 145 by a user in the state where the information about the gear 145 is received (S320).

The processor 150 determines whether one or more lighting devices provided in the vehicle are turned on (S330). Here, the lighting device may be any one of the taillight 120, the stop lamp 130, the sidelight 131, and the turn signal lamp 132. In this case, light emitted from the taillight 120, the stop lamp 130, the sidelight 131, or the turn signal lamp 132 may be included in the image (for example, the RGB image) received from the camera 110. In this case, the light emitted from the taillight 120, the stop lamp 130, or the sidelight 131 may be reflected by a ground or a wall surface and enter the camera 110.

In the meantime, one or more cameras 110 may be mounted in the vehicle. As described above, the camera 110 outputs an image through the AVM system, or a lateral side or a rear side of the vehicle, thereby assisting a driver to secure a view.

In the present specification, the camera 110 is described based on the rear camera mounted at the rear part of the vehicle to obtain a rear image of the vehicle. However, the camera is not limited thereto, and it is stated that the present invention is applicable to the camera mounted at a front part, a left part, or a right part of the vehicle.

The camera 110 includes an image sensor, such as a charge coupled device (CCD) or a complementary metal oxide semiconductor (CMOS).

In the meantime, the rear sensor 140 may detect an obstacle located at a rear side of the vehicle. The rear sensor 140 may be an ultrasonic sensor. When the obstacle is detected at the rear side, the rear sensor 140 outputs an alarm sound. In this case, the rear sensor 140 may output a detection signal divided into a plurality of levels according to a distance to the obstacle, and output an audible alarm sound according to the detection signal (S340). For example, when a distance to the obstacle detected by the rear sensor 140 is 1 m, the rear sensor 140 may output a first signal, when a distance to the obstacle detected by the rear sensor 140 is 50 cm, the rear sensor 140 may output a second signal, and when a distance to the obstacle detected by the rear sensor 140 is 30 cm, the rear sensor 140 may output a third signal. In this case, a voice output unit (not illustrated) may alarm the driver by outputting different voices corresponding to the first signal, the second signal, and the third signal, respectively.

The processor 150 determines whether a predetermined region in the image (for example, the RGB image) received from the camera 110 has a reference value or larger (S350). The reference value may be a value predetermined by an experiment. For example, the processor 150 may determine whether red has the reference value or larger based on whether a first color component in a region equal to or larger than a reference region in the entire RGB image has the reference value or larger. For example, the processor 150 may determine whether a red component in a region of 70% or more of the entire RGB image has the reference value or larger, and determine whether to decrease a gain of the red color.

When the gear state is the reverse gear state (S320), at least one lighting device (for example, the taillight 120, the stop lamp 130, the sidelight 131, or the turn signal lamp 132) is turned on (S330), a distance detection alarm is output through the rear sensor 140 (S340), and a predetermined area or more of the image received from the camera 110 has a first color (S350), the processor 150 calculates a gain of the first color, which is to be decreased according to the signal according to each of the plurality of levels output by the rear sensor 140 (S360). Here, the first color may be red. For example, the rear sensor 140 may output the signal by dividing the signal into the plurality of levels according to a distance to the obstacle as described above. When a distance to the obstacle detected by the rear sensor 140 is 1 m, the rear sensor 140 may output the first signal, when a distance to the obstacle detected by the rear sensor 140 is 50 cm, the rear sensor 140 may output the second signal, and when a distance to the obstacle detected by the rear sensor 140 is 30 cm, the rear sensor 140 may output the third signal. When the first signal is input from the rear sensor 140, the processor 150 may set a gain value of red R as G1. When a second signal is input from the rear sensor 140, the processor 150 may set a gain value of red R as G2. When a third signal is input from the rear sensor 140, the processor 150 may set a gain value of red R as G3. As described above, a red component is varied in an image displayed on the output unit 160 by varying a weighed value of red according to the distance to the obstacle detected by the rear sensor.

The processor 150 processes the first color to be decreased in the image (for example, the RGB image) (S370). Here, the first color may be red. The processor 150 may decrease the gain of the red color calculated in the image (for example, the RGB image).

Then, the output unit 160 outputs the image of which the red color is processed to be decreased (S380). Here, the output nit 160 includes one or more displays. The output unit 160 may be an AVN device mounted inside the vehicle to provide audio, video, and navigation functions. The output unit 160 may be mounted in a center fascia or a cluster.

Figure 4:
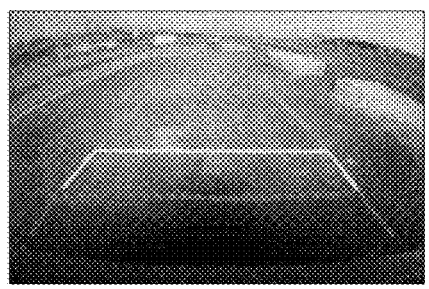
FIG. 4 is a diagram referred to for describing an effect of the vehicle assistance apparatus according to the exemplary embodiment of the present invention.
Figure 4:
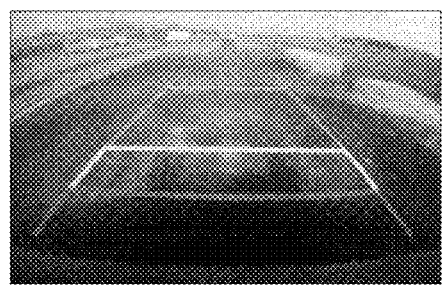

FIG. 4 is a diagram referred to for describing an effect of the vehicle assistance apparatus according to the exemplary embodiment of the present invention.

As illustrated in FIG. 4A, in the state where the taillight 120 or the stop lamp 130 is turned on, the image (for example, the RGB image) received from the camera 120 (for example, the rear camera) includes a plurality of red. The reason is that light emitted from the taillight 120 or the stop lamp 130 is reflected from the ground or a wall surface to enter the camera 110.

When the processor 150 processes the red color to be decreased in the image according to the exemplary embodiment of the present invention, the red color component is decreased and the image, in which awareness of difference is removed, may be displayed on the output unit 160 as illustrated in FIG. 4B. The vehicle assistance apparatus according to the exemplary embodiment of the present invention may provide a driver with a more realistic rear image by providing an image, in which the red color component is decreased so that a noticeable difference is removed.

While the exemplary embodiment of the present invention has been illustrated and described above, the present invention is not limited to the aforementioned specific exemplary embodiment, various modifications may be made by a person with ordinary skill in the art to which the present invention pertains without departing from the subject matters of the present invention that are claimed in the claims, and these modifications should not be appreciated individually from the technical spirit or prospect of the present invention.

What is claimed is:

1. An apparatus for assisting a vehicle, comprising:
   a gear mounted in a vehicle and configured to switch an operation mode into any one of a travelling mode, a parking mode, a neutral mode, and a reverse mode of the vehicle;
   one or more lighting devices provided in the vehicle;
   a camera mounted in the vehicle, and configured to obtain an image around the vehicle;
   a processor configured to process a first color generated by the lighting device to be decreased in an RGB image, which is received from the camera and includes light emitted from the lighting device when the operation mode is switched into the reverse mode; and
   an output unit configured to output the image processed by the processor,
   wherein the processor includes:
      a determining unit configured to determine whether the first color in the RGB image has a reference value or larger; and
      a correcting unit configured to decrease a gain of the first color in the RGB image by receiving a result of the determination from the determining unit.

2. The apparatus of claim 1, wherein the camera is attached to a rear part of the vehicle to obtain a rear image of the vehicle.

3. The apparatus of claim 1, wherein the determining unit determines whether the first color in the RGB image has the reference value or larger based on whether a component of the first color in a region equal to or larger than a reference region in the RGB image has the reference value or larger.

4. The apparatus of claim 1, wherein the lighting device includes at least one of a taillight which is mounted at the rear part of the vehicle and is turned on when a headlight of the vehicle is turned on, a stop lamp, which is turned on when a brake pedal of the vehicle is stepped on, a sidelight which displays existence of the vehicle and a width of the vehicle; and a turn signal lamp which notifies another vehicle that the vehicle changes a direction or that the vehicle is in a temporal dangerous state.

5. The apparatus of claim 1, wherein the output unit is an audio video navigation (AVN) device mounted inside the vehicle.

6. The apparatus of claim 1, wherein the RGM image includes light emitted from the lighting device and reflected from the ground or a wall surface.

7. An apparatus for assisting a vehicle, comprising:
a gear mounted in a vehicle and configured to switch an operation mode into any one of a travelling mode, a parking mode, a neutral mode, and a reverse mode of the vehicle;
one or more lighting devices provided in the vehicle;
a camera mounted in the vehicle, and configured to obtain an image around the vehicle;
a processor configured to process a first color generated by the lighting device to be decreased in an RGB image, which is received from the camera and includes light emitted from the lighting device when the operation mode is switched into the reverse mode;
an output unit configured to output the image processed by the processor; and
a rear sensor attached to the rear part of the vehicle and configured to detect an obstacle located at a rear side of the vehicle,
wherein the processor decreases a gain of the first color based on a detection signal received from the rear sensor.

8. The apparatus of claim 7, wherein the rear sensor outputs the detection signal, which is divided into a plurality of levels according to a distance to the obstacle, and
the processor varies and decreases a degree of the gain of the first color in accordance with each of the plurality of levels.

9. The apparatus of claim 7, wherein the rear sensor is an ultrasonic sensor.

10. An operating method of an apparatus for assisting a vehicle, comprising:
receiving gear information;
turning on one or more lighting devices provided in a vehicle;
obtaining an image around the vehicle from a camera attached to the vehicle;
processing a first color generated by the lighting device to be decreased in an RGB image, which is received from the camera and includes light emitted from the lighting device when the received gear information indicates a reverse mode; and
outputting the processed image through an output unit,
wherein the processing includes:
determining whether the first color in the RGB image has a reference value or larger; and
decreasing a gain of the first color in the RGB image when the first color in the RGB image has the reference value or larger.

11. The operating method of claim 10, wherein the camera is attached to a rear part of the vehicle to obtain a rear image of the vehicle.

12. The operating method of claim 10, wherein the determining is performed by determining whether a component of the first color in a region equal to or larger than a reference region in the RGB image has the reference value or larger.

13. The operating method of claim 10, further comprising:
detecting an obstacle located at a rear side of the vehicle by a rear sensor attached to the rear part of the vehicle; and
outputting a detection signal when the obstacle is detected,
wherein the processing includes decreasing a gain of the first color based on the detection signal.

14. The operating method of claim 13, wherein the outputting includes outputting, by the rear sensor, the detection signal, which is divided into a plurality of levels according to a distance to the obstacle, and
the processing includes varying and decreasing a degree of the gain of the first color in accordance with each of the plurality of levels.

15. The operating method of claim 13, wherein the rear sensor is an ultrasonic sensor.

16. The operating method of claim 10, wherein the lighting device includes at least one of a taillight which is mounted at the rear part of the vehicle and is turned on when a headlight of the vehicle is turned on, a stop lamp, which is turned on when a brake pedal of the vehicle is stepped on, a sidelight which displays existence of the vehicle and a width of the vehicle; and a turn signal lamp which notifies another vehicle that the vehicle changes a direction or that the vehicle is in a temporal dangerous state.

17. The operating method of claim 10, wherein the output unit is an audio video navigation (AVN) device mounted inside the vehicle.

18. The operating method of claim 10, wherein the RGM image includes light emitted from the lighting device and reflected from the ground or a wall surface.

* * * * *